(12) United States Patent
Bedford et al.

(10) Patent No.: US 7,767,011 B2
(45) Date of Patent: Aug. 3, 2010

(54) AQUEOUS GEL INK COMPOSITIONS AND METHOD OF PRINTING SAME

(75) Inventors: Christine E. Bedford, Burlington (CA); Marcel P. Breton, Mississauga (CA); Timothy P. Bender, Port Credit (CA)

(73) Assignee: Xerox Corporation, Norwalk, CT (US)

( * ) Notice: Subject to any disclaimer, the term of this patent is extended or adjusted under 35 U.S.C. 154(b) by 896 days.

(21) Appl. No.: 11/139,782

(22) Filed: May 31, 2005

(65) Prior Publication Data

US 2006/0266259 A1   Nov. 30, 2006

(51) Int. Cl.
*C09D 11/02* (2006.01)

(52) U.S. Cl. ............... 106/31.27; 106/31.6; 106/31.58; 106/31.86; 106/31.13

(58) Field of Classification Search ............ 106/31.27, 106/31.6, 31.13, 31.58, 31.86
See application file for complete search history.

(56) References Cited

U.S. PATENT DOCUMENTS

| | | | |
|---|---|---|---|
| 4,021,252 A | 5/1977 | Banczak et al. | |
| 4,840,674 A | 6/1989 | Schwarz | |
| 4,920,361 A * | 4/1990 | Arahara et al. | 346/140.1 |
| 5,100,468 A * | 3/1992 | Yuasa et al. | 524/210 |
| 5,207,825 A | 5/1993 | Schwarz, Jr. | |
| 5,223,026 A | 6/1993 | Schwarz, Jr. | |
| 5,281,261 A | 1/1994 | Lin | |
| 5,372,852 A | 12/1994 | Titterington et al. | |
| 5,389,958 A | 2/1995 | Bui et al. | |
| 5,531,817 A * | 7/1996 | Shields et al. | 106/31.38 |
| 5,531,818 A | 7/1996 | Lin et al. | |
| 5,539,038 A | 7/1996 | Katsen et al. | |
| 5,556,727 A | 9/1996 | Ciccarelli et al. | |
| 5,593,807 A | 1/1997 | Sacripante et al. | |
| 5,693,129 A | 12/1997 | Lin | |
| 5,945,245 A | 8/1999 | Mychajlowskij et al. | |
| 6,156,858 A | 12/2000 | Keoshkerian et al. | |
| 6,458,192 B1 * | 10/2002 | Tsujio | 106/31.32 |
| 6,471,758 B1 * | 10/2002 | Kelderman et al. | 106/31.29 |
| 6,547,380 B2 | 4/2003 | Smith et al. | |
| 7,172,276 B2 | 2/2007 | Breton et al. | |
| 7,202,883 B2 | 4/2007 | Breton et al. | |

* cited by examiner

*Primary Examiner*—Jerry Lorengo
*Assistant Examiner*—Veronica Faison-Gee
(74) *Attorney, Agent, or Firm*—Oliff & Berridge, PLC

(57) ABSTRACT

An ink comprising a liquid vehicle, a gelling agent, an electrolyte and optionally at least one colorant. A method of forming an image, comprising heating the ink to a first temperature, wherein the first temperature is above a sol-gel temperature, and jetting the heated ink onto a transfer member or an image receiving substrate, wherein the transfer member or image receiving substrate is maintained at a second temperature at which the ink forms a gel.

18 Claims, No Drawings

AQUEOUS GEL INK COMPOSITIONS AND METHOD OF PRINTING SAME

BACKGROUND

Described herein are ink compositions ideally suited for use in ink jet ink printing devices. In embodiments, the ink includes a gelling agent, an electrolyte additive, and a liquid vehicle along with a colorant. The ink may also optionally contain a co-solvent, a film forming polymer resin and other additives.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Conventional phase change hot melt inks typically used with ink jet printers of the aforementioned type frequently utilize a wax based ink vehicle, e.g., a crystalline wax. Piezoelectric ink jet devices utilizing wax-liked solid inks typically suffer from two shortcomings. First, use of such crystalline waxes requires that the printhead be kept at least at 135° C. throughout printing. The wax based inks are heated to such high temperatures to decrease their viscosity for proper jetting. The devices thus consume large amounts of energy due to the higher jetting temperatures required for the melting and jetting of conventional solid hot melt inks. Second, if the printhead is cooled and re-warmed, a lengthy purge cycle that consumes significant amounts of ink must be carried out. Third, the brittle crystalline waxes also typically do not provide robust images and are easily scratched. This is because wax based inks generally crystallize at temperatures greater than room temperature and therefore the wax based ink that has been transferred to the recording medium is essentially as hard as it will get. The high energy consumption, waste of expensive ink during purging, and fragile images all cause customer dissatisfaction, and in some markets prevent any sales penetration at all.

Conventional aqueous ink jet inks that print on a variety of substrates are also known in the art. In U.S. Pat. No. 4,021,252, disclosed is an ink composition suitable for ink jet printing on metal surfaces. The ink includes, in solution, a colorant, a resin component, an alcohol-water solvent and optionally an electrolyte. The ink has a viscosity of less than 5 cPs at room temperature (68° F.).

In U.S. Pat. No. 5,539,038, disclosed is an ink jet ink comprising water, a pigment, a polymeric electrolyte, preferably a sodium, potassium or lithium salt of a polymeric carboxylic acid, a polyhydric alcohol and a stearate, preferably aluminum stearate.

Conventional aqueous ink jet inks are not suitable as replacement for the phase change hot melt inks typically used with ink jet printers described in the aforementioned U.S. Pat. No. 5,372,852.

While known compositions and processes are suitable for their intended purposes, a need remains for improvements in phase change inks, for example with respect to jetting and stand-by temperatures and fusing latitude. Particularly, a need also remains for improvement in aqueous inks, for example with respect to phase change characteristics (gelling), jetting latitude, and image quality.

SUMMARY

In embodiments, described is an ink comprising a liquid vehicle, a gelling agent, an electrolyte and optionally at least one colorant. The ink may further comprise a liquid vehicle co-solvent, a water soluble or water dispersible film forming polymer resin, and optionally other additives.

In further embodiments, described is a method of forming an image, comprising heating an ink to a first temperature, wherein the ink comprises a liquid vehicle, a gelling agent, an electrolyte and optionally at least one colorant, and wherein the first temperature is above a sol-gel temperature of the ink, and jetting the heated ink onto a member, wherein the member is maintained at a second temperature at which the ink forms a gel. The member may be either an image receiving substrate or a transfer member. If a transfer member, the image formed on the transfer member is then transferred to an image receiving substrate.

DETAILED DESCRIPTION OF EMBODIMENTS

In one embodiment, the ink is comprised of a liquid vehicle, a gelling agent, an electrolyte and optionally a colorant. The ink may further comprise a co-solvent, a film forming polymer resins, and optionally other additives.

In one preferred embodiment, the liquid vehicle comprises water. In another preferred embodiment, the liquid vehicle comprises water and a water soluble organic co-solvent such as ethylene glycol, propylene glycol, diethylene glycols, glycerol, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monoalkyl ether, including methyl, ethyl, butyl and hexyl and ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, other water-soluble or water-miscible materials, mixtures thereof, and the like.

When mixtures of water and water-soluble or miscible organic liquids are selected as the liquid vehicle, the water to organic liquid ratio can range from 100:0 to 30:70, preferably from about 97:3 to about 60:40. However, amounts outside these ranges can be used, as desired. The non-water component of the liquid vehicle generally serves as a humectant or co-solvent, and preferably has a boiling point higher than that of water (100° C.).

Further examples of suitable humectants are disclosed, for example, in U.S. Pat. Nos. 5,281,261, 5,531,818, 5,693,129, and 4,840,674, the disclosures of which are incorporated herein by reference in their entireties.

In embodiments of the ink jet ink compositions, the liquid vehicle is typically present in an amount of from about 70 to about 99.9 percent by weight of the ink, and preferably from about 80 to about 99 percent by weight of the ink. However, the amount of the liquid vehicle can be outside these ranges, if desired.

Examples of gelling agents include, but are not limited to, agar, algin, carrageenan, fucoidan, laminaran, gum Arabic, corn hull gum, gum ghatti, guar gum, karaya gum, locust bean gum, pectin dextrans, starches, carboxymethylcellulose, polyvinyl alcohol, gellan gum, xanthum gum, iota-carrageenan, and methylcellulose. A preferred gelling agent is a low acyl gellan gum, commercially available as KELCOGEL AFT® (manufactured by CP Kelco, Chicago, Ill.). The structure of KELCOGEL AFT® is as follows:

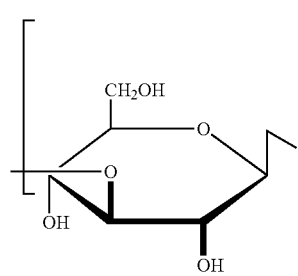

The gelling agent is present in an amount from about 0.001 to about 5 percent by weight of the ink, preferably in an amount from about 0.01 to about 3 percent by weight of the ink, and more preferably in an amount from about 0.1 to about 2.5 percent by weight of the ink.

In order to improve the gelling action, an electrolyte is added to the ink, in this context the electrolyte is defined as any ionic or covalent compound that dissolves to give solutions that contain ions. Examples of suitable electrolytes suitable for purposes herein include, but are not limited to, sodium, potassium or lithium salts of polystyrenesulfonate and its copolymers, preferably sodium salts, buffers such as tris(hydroxymethyl)aminomethane hydrochloride TRIZMA-HCL® available from Sigma Aldrich.

Other polyelectrolytes suitable for use herein include, but are not limited to, salts of polymeric carboxylic acids such as those described in U.S. Pat. No. 5,539,038, column 4, line 23 to 41, the disclosure of which is included herein by reference. Also suitable are sulphonated polyesters such as those disclosed in copending applications U.S. patent application Ser. No. 11/008,627 and copending U.S. patent application the disclosures of which are included herein in their entirety by reference. Additional examples of sulfonated polyesters which may be used in the present invention include those illustrated in U.S. Pat. Nos. 5,593,807 and 5,945,245, the disclosures of which are totally incorporated herein by reference, for example including sodium sulfonated polyester, and more specifically, a polyester such as poly(1,2-propylene-sodio 5-sulfoisophthalate), poly(neopentylene-sodio 5-sulfoisophthalate), poly(diethylene-sodio 5-sulfoisophthalate), copoly(1,2-propylene-sodio 5-sulfoisophthalate)-copoly-(1,2-propylene-terephthalate-phthalate), copoly(1,2-propylene-diethylene-sodio 5-sulfoisophthalate)-copoly-(1,2-propylene-diethylene-terephthalate-phthalate), copoly(ethylene-neopentylene-sodio 5-sulfoisophthalate)-copoly-(ethylene-neopentylene-terephthalate-phthalate), and copoly(propoxylated bisphenol A)-copoly-(propoxylated bisphenol A-sodio 5-sulfoisophthalate).

The electrolyte is preferably present in the ink in the range of about 0.01 weight % to about 20.0 weight %, preferably from about 0.1 to about 5 weight % and more preferably from about 0.1 to about 2.5 weight %. The ratio of gelling agent to electrolyte is about 1.5:1 to about 4:1, and preferably about 2:1 to about 3:1.

Preferably the electrolyte is made by the stable free radical polymerization process as disclosed in U.S. Pat. No. 6,156,858, incorporated herein in its entirety by reference. Examples of electrolytes made by the stable free radical polymerization process suitable for purposes herein include, but are not limited to derivatives of styrenes, acrylates, styrene acrylates, styrene butadienes, esters, and the like. Specific examples include polystyrenesulfonate, and its copolymers,

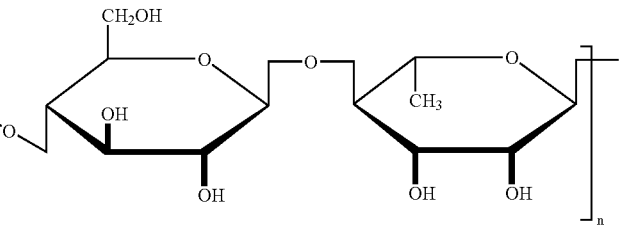

including styrenesulfonate copolymerized with one or more of the following but not limited to n-butyl acrylate, methyl-methacrylate, styrene, butadiene, isoprene, α-hexene (and/or other higher α-olefins), vinylchloride, ethylacrylate, acrylic acid, methacrylic acid, crotonic acid, acrylonitrile, acrylamide, N-methylacrylamide and the like.

Preferably, the electrolyte is a polystyrenesulfonate having the following structure:

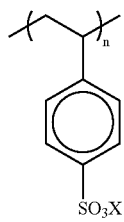

X represents a counterion. The counterion of the polystyrenesulfonate may be, but is not limited to, for example, sodium, potassium, lithium, magnesium or calcium. A monovalent counterion such as sodium is preferred.

Suitable for use herein are polystyrene sulfonate polymers, obtained by free radical polymerization having a weight average molecular weight in the range of about 1,000 g/mole to about 200,000 g/mole, preferably from about 2,000 to about 100,000 g/mole. Especially preferable are polystyrene sulfonates obtained by the stable free radical polymerization processes (SFRP-PSS). The SFRP-PSS preferably has a weight average molecular weight in the range of about 2,000 g/mole to about 100,000 g/mole, preferably from about 10,000 to about 20,000 g/mole with a polydispersity (ratio of weight to number average molecular weight) of less than 2.0, preferably less than 1.5.

Preparing the electrolyte using the stable free radical polymerization process as described in U.S. Pat. No. 6,156,858 allows the gel ink to comprise a block copolymer. Another block or blocks of the block copolymer are prepared using the stable free radical polymerization process and are bonded to the electrolyte produced by this process. Preferably, the other block or blocks of the block copolymer that are not derivatives of styrene sulfonate are film forming polymer resins. This allows the gel ink to have film forming properties that could not be as easily achieved using an electrolyte prepared by a different method. For aqueous inks, polymer latex particles having film forming properties are often used, examples are disclosed in copending U.S. patent application Ser. No. 11/008,627, incorporated herein by reference.

This technique permits the preparation of a wide range of different materials which are either difficult to prepare, or not available with other polymerization processes. For example, the architecture or topology of the polymer (i.e., comb, star, dendritic, etc.), composition of the backbone (i.e., random, gradient, or block copolymer), inclusion of functionality (i.e., chain end, site specific, etc.) can all be readily manipulated using free radical methodologies while still retaining a high degree of control over the molecular weight and polydispersity.

Each type of block in a block copolymer shows the behavior (e.g., crystallinity, melting temperature, glass transition temperature, etc.) present in the corresponding homopolymer as long as the block lengths are not too short. This offers the ability to combine the properties of two very different polymers into one block copolymer, i.e., an electrolyte and a film forming polymer is possible. This provides the advantage of homogeneity, i.e., the two additives combined into one are more able to remain monophasic instead of risking the possibility of incompatible additives that prefer being biphasic.

For example, the general formula of a block copolymer comprising a preferred polystyrenesulfonate is:

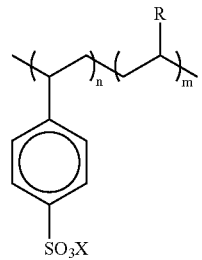

The stable free radical polymerization process can be used to prepare random copolymers, block copolymers and multiblock copolymers. Block copolymers are preferred herein. The mole proportions of the monomers in the block copolymers can be of any values, the restriction being that the resulting block copolymer must be soluble or dispersable in the ink of the invention. Blends of homopolymers and copolymers are also suitable.

The colorant for the ink compositions of the present invention includes a dye, pigment, mixtures of dyes and pigment, mixtures of pigments, mixtures of dyes, and the like. The colorant can be black, cyan, magenta, yellow, red, blue, green, brown, mixtures thereof, and the like, and is preferably the carbon black Levanyl carbon black obtained from Bayer. Examples of suitable black pigments include various carbon blacks such as channel black, furnace black, lamp black, and the like. Colored pigments include red, green, blue, brown, magenta, cyan, yellow, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3'-dichlorobenzidine acetoacetanilides, a monoazo pigment identified in the Color Index as CI 12700, CI Solvent Yellow 16, a nitrophenol amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot CSC-440L and Levanyl Black A-SF. Of these, Levanyl Black A-SF and Cabot CSX-440L are the most preferred. Examples of suitable colorants, like pigments that may be selected in embodiments are illustrated in U.S. Pat. No. 5,556,727, the disclosure of which is totally incorporated herein by reference.

Preferably, the colorant, which can inlcude pigments, dyes, mixtures thereof, mixtures of dyes, mixtures of pigments, and the like, particle size is small to enable for example, a stable colloidal suspension of the particles in the liquid vehicle and to prevent clogging of the ink channels when the ink is used in a thermal ink jet printer. Preferred pigment particle average diameters are generally from about 0.001 to about 2 microns, and more preferably from about 0.01 to about 1 micron in volume average diameter, although the particle size can be outside these ranges. A more preferred colorant, especially particle size includes particles with at least 70 percent of the particles being below 0.1 micron with no particles being greater than 1.0 micron (measured on a Hodaka CAPA 700 Particle Size Analyzer). More preferably, the colorant, especially pigment particle size includes particles having at least 90 percent of the particles being below 0.1 micron with no particles being greater than about 1.0 micron.

The colorant is present in the ink composition in various effective amounts and generally for example from about 1 to about 20 percent by weight, preferably from about 3 to about 10 percent by weight, more preferably from about 4 to about 9 percent by weight, and most preferably from about 4 to about 8 percent, although the amount can be outside of these ranges.

Examples of suitable dyes that may be added to the inks of the present invention include reactive dyes, direct dyes, anionic dyes, acid dyes, food dyes, and the like. Specific examples of suitable dyes include mixtures of the ProJet dyes available from Zeneca (ICI) such as ProJet Fast Magenta 2, ProJet Fast Black 2, ProJet Fast Yellow 2, ProJet Fast Cyan 2, and ProJet Fast Black 2-CF1 with less waterfast dyes such as ProJet Yellow 1 G, ProJet Yellow OAM, ProJet Cyan 1, ProJet Magenta 3B-OA, ProJet Magenta IT, ProJet Magenta 1, and ProJet Black OA-PZ. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brillant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon, and the like. Also suitable are water soluble dyes available from Ilford, Black K-1334, Y104, M-377, Y-1189, and Y-178.

If the electrolyte is a block polymer made by stable free radical polymerization, an optional preferred second polymer to include is a film forming polymer resin. Film forming polymer resins that may be included in the ink include acrylics, vinyls, and mixtures thereof. These film forming polymer resins include, but are not limited, to vinyl esters, acrylic esters, or methacrylic esters such as methyl (meth)acrylate, ethyl(meth)acrylate, isopropyl(meth)acrylate, n-butyl(meth)acrylate, isobutyl(meth)acrylate, n-amyl(meth)acrylate, isoamyl(meth)acrylate, n-hexyl (meth)acrylate, 2-ethylhexyl (meth)acrylate, octyl(meth)acrylate, decyl (meth)acrylate, dodecyl(meth)acrylate, octadecyl(meth)acrylate, cyclohexyl (meth)acrylate, phenyl(meth)acrylate, benzyl(meth)acrylate, 2-hydroxylethyl (meth)acrylate, 2-hydroxypropyl(meth)acrylate, glycidyl(meth)acrylate, and glycidyl acrylate and vinyl acetate, acrylonitrile, meth-acrylonitrile, aromoatic vinyl compounds such as styrene, 2-methylstyrene, vinyltoluene, t-butylstyrene, chlorostyrene, vinylidene fluoride, ethylene, propylene, isopropylene, butadiene, vinyl pyrrolidone, vinyl chloride, vinyl either, vinyl ketone, chloroprene, and carboxyl-containing compounds, for example ethylenically unsaturated carboxylic acids such as acrylic acid, methacrylic acid, maleic acid, or monoalkyl esters thereof, itaconic acid or monoalkyl esters thereof, fumaric acid or monoalkyl esters thereof, amido-containing compounds such as acrylamide, and N,N-dimethylacrylamide and alkylamino esters of acrylic acid or methacrylic acid, for example amino-containing compounds such as N-methylaminoethyl methacrylate, N-methylaminoethyl acrylate, diemethylaminoethyl methacrylate, diethylaminoethyl methacrylate and diethylaminoethyl methacrylate, unsaturated amides containing an alkylamino group such as N-(2-dimethylaminoethyl)acrylamide, N-(2-dimethylaminoethyl)methacrylamide and N,N-dimethylaminopropylacrylamide, monovinylpyridines such as vinylpyridine, and vinyl ethers containing an alkylamino group such as dimethylaminoethyl vinyl ether, a vinylimidazole and the like and compounds containing a sulfonic group such as vinylsulfonic acid, styrenesulfonic acid and salts thereof, and 2-acryloylamino-2-methylpropanesulfonic acid and salts thereof.

The inks of embodiments may further include conventional type additives to take advantage of the known functionality associated with such conventional additives. Such additives may include, for example, defoamers, slip and leveling agents, pigment dispersants, etc.

Examples of specific optional ink additives that may be selected include biocides, such as DOWICIL® 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives, such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of for example, from 0 to about 50 percent by weight, and preferably from about 1 to about 30 percent by weight, although the amount can be outside these ranges, pH controlling agents, such as acids or bases, phosphate salts, carboxylates salts, sulfite salts, amine salts, and the like, each present in an amount of for example, from 0 to about 1 percent by weight, preferably from about 0.001 to about 1 percent by weight, and more preferably from about 0.01 to about 1 percent by weight, although the amount can be outside these ranges, or the like. Preferred pH controlling agents are TRIZMA buffers available from Sigma-Aldrich, mixtures of TRIZMA-HCL® and Trizma Base.

Other examples of suitable ink additives include those illustrated in U.S. Pat. No. 5,223,026 and U.S. Pat. No. 5,207,825, the disclosures of each of which are totally incorporated herein by reference.

Surfactants can be added to the inks of the present invention. Examples of surfactants that can be selected for the inks of the present invention are for example, sodium alkyl sulfate and sodium alkoxyl sulfate such as sodium lauryl sulfate and N-lauroylsarcosine. Other examples of surfactants include alcohol surfactants and more specifically a mixture of secondary alcohols reacted with ethylene oxide in which the secondary alcohols contain for example between about 11 and about 15 carbons, and wherein the secondary alcohol based surfactant is of the Tergitol 15-S series surfactants available from Union Carbide. Examples of secondary alcohol surfactants include those of the general formula $C_{11-15}H_{23-31}$ $O[CH_2CH_2O]_xH$, wherein x represents a suitable number and which surfactants include: 1) Tergitol 15-S-40 surfactant with a degree of ethoxylation (mole/mole, avg) of 41.1, a calculated HLB (hydrophile-lipophile balance) value of 18.0 and a molecular weight in the range of about 1,800-2,100; 2) Tergitol 15-S-30 surfactant with a degree of ethoxylation (mole/mole, avg) of 31.0, a calculated HLB value of 17.5 and a molecular weight in the range of about 1,440-1,640; 3) Tergitol 15-S-20 surfactant with a degree of ethoxylation (mole/mole, avg) of 20.1, a calculated HLB value of 16.4 and a molecular weight in the range of about 1,020-1,150; 4) the Tergitol 15-S-15 surfactant with a degree of ethoxylation (mole/mole, avg) of 15.5, a calculated HLB value of 15.6 and a molecular weight in the range of about 850-920; 5) Tergitol 15-S-9 surfactant with a degree of ethoxylation (mole/mole, avg) of 8.9, a calculated HLB value of 13.3 and a calculated molecular weight in the range of about 584. These surfactants have excellent solubility in water and their cloud point (1% solution) is for example above about 60° C. With cosolvents such as sulfolane, thiodiglycol, and the like, the cosolvents can be selected in concentrations, or amounts ranging from about 0.001 to about 10.0 weight percent and preferably about 0.0056, 0.018, 0.028, 0.071 and 0.22 weight percent to about 8 weight percent of surfactant such as Tergitol 15-S-9, 15-S-15, 15-S-20, 15-S-30, 15-S-40 respectively. The lower effective concentrations correspond to the critical micelle concentrations of the selected surfactants. The surfactants of the present invention are preferably used in the absence of conventional penetrants such as butyl carbytol, cyclohexylpyrrolidinone, and low molecular weight alcohols such as methanol, ethanol, propanol, butanol and isopropanol for optimum print quality, that is excellent optical density, edge raggedness particularly when the drytime is less than about 10 seconds. Other Tergitol surfactants can also be selected in combination with the aforementioned surfactants, such as for example Tergitol 15-S-3, HLB=8.3; 15-S-5, HLB=10.6; and 15-S-7, HLB=12.4. The weight percent of each surfactant in the mixture is selected so as to satisfy two conditions: 1) HLB effectiveness: weight percent of surfactant A times the HLB of surfactant A+weight percent of surfactant B times the HLB of surfactant B>13; 2) the surfactant mixture is to remain soluble in the ink up to a temperature of 60° C.

The inks may also include polyhydroxy alcohol surfactants such as the PEG 1540 monolaurate, the PEG 1000 monoricinoleate, the PEG 75 lanolin alcohol ether, the PEG 6000 monooleate, the PEG 200 castor oil (also available under the name Mapeg CO-200, PPG/Speciality Chem.) and more specifically the Surfynol 485, a PEG-30 tetramethyl decynediol available from Air Products and Chem., and Solan E, a polyethylene glycol (75) lanolin available from Croda, Parsippany and which surfactants are present in the important amounts indicated herein, such as from 2 to about 7 weight percent or parts based on the total ink components. The PEG 1540 monolaurate has a HLB value of about 17; the PEG 1000 monoricinoleate, a value of 17.5; the PEG 75 lanolin alcohol ether, a value of about 16; the PEG 6000 monooleate, a value of 19; the PEG 200 castor oil, a value of 18.1; the Surfynol 485, a value of 17; and the Solan E, a value of 15. Other commercial surfactants are also suitable. These are for example the Atlas G-1288 (ICI Surf. Belgium), a PEG triglyceride with an HLB value of 16.0; the Atlas G-1295 (ICI Surf. Belgium), a PEG triglyceride with an HLB value of 17.5; the Atlas G-1649 (ICI Am.), a PEG alkyl aryl ether with an HLB value of 16.0; the Altas G-2151 (ICI Am.), a PEG-30 stearate with an HLB value of 16.0; the Atlas G-2162 (ICI Am.), a PEG-25 propylene glycol stearate with an HLB value of 16.0; the Atlas G-3780A (ICI Am.), a PEG-20 tallow amine with an HLB value of 15.5; the Renex 720 (ICI Am.), a PEG-20 syn. primary C13-15 alcohol with an HLB value of 16.2; the Mapeg 1000 MS (PPG/Speciality Chem.), a PEG-20 stearate with HLB value of 15.7; the Nissan Nonion DS-60HN (Nippon Oils & Fats), a PEG distearate of HLB value of 19.0; the Nissan Nonion E-230, a PEG oleyl ether with an HLB value of 16.6; the Nissan Nonion HS-220 (Nippon Oils & Fats), a PEG octyl phenol ether with an HLB value of 16.2; the Nissan Nonion HS-240 (Nippon Oils & Fats), a PEG-40 octyl phenol ether with an HLB value of 17.9; the Nissan Nonion HS-270 (Nippon Oils & Fats), a PEG-70 octyl phenol ether with an HLB value of 18.7.

The ink compositions can be prepared by any desired suitable method. For example, cold water is mixed with the gelling agent and heated to a temperature of about 50° C. to about 100° C. until the gelling agent is dissolved. The electrolyte is added to the mixture once the electrolyte is dissolved, other additives may be mixed into the ink. The heat is then turned off and the mixture is stirred until the mixture is cooled to ambient temperature or below the gel transition.

In another embodiment, the ink is prepared by mixing all of the ingredients together and heating to a temperature of about 50° C. to about 100° C. and stirring until a homogeneous ink composition is obtained. The ink is then cooled to ambient temperature or below the gel transition.

The inks described herein are preferably jetted at temperatures of about 30° C. to about 80° C., more preferably about 30° C. to about 60° C. At jetting, the inks preferably have a viscosity of from about 5 to about 16 cPs, most preferably about 8 to 13 cPs. The inks are thus ideally suited for use in ink jet devices.

The gelling agent functions to increase the viscosity of the ink within a desired temperature range. In particular, the gelling agent forms a solid-like gel in the ink vehicle at temperatures below the temperature at which the ink is jetted. For example, the ink ranges in viscosity from about $10^2$ to about $10^{10}$ cPs and preferably between $10^{2.5}$ to about $10^{10}$ cPs in the solid-like phase. These viscosities are obtained using the cone and plate technique, at a shear rate of $10 \, s^{-1}$. The gel phase typically comprises a solid-like phase and a liquid phase in coexistence, wherein the solid-like phase forms a three-dimensional network structure throughout the liquid phase and prevents the liquid phase from flowing at a macroscopic level. The inks exhibit a thermally reversible transition between the gel state and the liquid state when the temperature is varied above or below the gel point of the ink. This temperature is generally refereed to as a sol-gel temperature. This cycle of gel reformation can be repeated a number of times, since the gel is formed by physical, non-covalent interactions between the gelling agent molecules, such as hydrogen bonding, aromatic interactions, ionic bonding, coordination bonding, London dispersion interactions, or the like.

At such low jetting temperatures, the conventional use of temperature differential between the jetted ink and the substrate upon which the ink is jetted in order to effect a rapid phase change in the ink (i.e., from liquid to solid or semisolid) may not be as effective. The gelling agent can thus be used to affect a rapid viscosity increase in the jetted ink upon the substrate. In particular, jetted ink droplets would be pinned into position on a receiving substrate such as an image receiving medium (e.g., paper) or an intermediate transfer member (e.g., a transfuse drum or belt) that is at a temperature cooler than the ink jetting temperature of the ink through the action of a phase change transition in which the ink undergoes a significant viscosity change from a liquid state to a gel state (or semi-solid state).

In embodiments, the temperature at which the ink is in gel state is, for example, approximately from about 15° C. to about 50° C. The gel ink liquefies at temperatures from about 30° C. to about 80° C., preferably from about 30° C. to about 60° C. In cooling from the jetting temperature liquid state to the gel state, the ink undergoes a significant viscosity increase. The viscosity increase is at least a 10-fold increase in viscosity and preferably at least 20-fold increase in viscosity The ink can be jetted onto an intermediate transfer member and then transferred onto an image receiving substrate, such as paper. In the alternative, the ink may be jetted directly onto the image receiving substrate.

The inks can be employed in apparatuses for direct printing ink jet processes, wherein droplets of the melted ink are ejected in an imagewise pattern onto a recording substrate, and the recording substrate is a final recording substrate. In this embodiment, the ink is heated to a first temperature above the gel point of the ink and printed directly onto an image receiving substrate. The image receiving substrate is preferably kept at a second temperature at which the ink forms a gel state, which is preferably at or slightly above room temperature as discussed above. For example, the substrate may be maintained at least at ambient temperature, i.e., between about 15° C. and about 50° C., preferably from about 15° C. to about 30° C.

The inks are ideally suited for jetting onto an intermediate transfer substrate, e.g., an intermediate transfuse drum or belt. In a suitable design, the image may be applied by jetting appropriately colored inks during four to six rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member.

The intermediate transfer member may take any suitable form, although it is preferably a drum or belt. The member surface may be at room temperature, although in embodiments it is preferable to heat the member such that a surface temperature thereof is maintained within a narrow temperature range so as to control the gelling characteristics of the inks over a wide range of environmental conditions. This temperature range is preferably, for example, within the gel state temperature range for the ink. For example, the surface may be maintained at a temperature of about 15° C. to about 50° C., preferably from about 15° C. to about 30° C. In this way, the jetted ink may be made to rapidly form a gel, which gel is maintained on the surface of the transfer member until transfer to the image receiving substrate.

Following jetting to the intermediate transfer member and optional intermediate curing thereon, the ink is thereafter transferred to an image receiving substrate. The substrate may be any suitable material such as paper, fabric, a transparency, etc., although the ink is most preferably used in forming images on paper.

In embodiments, the ink is in a gel state in the temperature range used for transfuse. Under these conditions, the ink image can be fused to the final recording substrate with low pile height and minimum showthrough. In another embodiment, the ink is in a gel state in the temperature range used for fusing or post-fusing the image. The fusing and/or transfuse latitude of the ink of the present invention is greatly increased compared to the latitude of conventional wax-based solid inks, since gel inks can be fused over a wider temperature range, typically at all temperatures below the temperature defined as the gel point down, and at lower pressure compared to conventional wax-based inks. On the other hand, waxed-based inks have a sharp melting transition to give low viscosity liquids that penetrate deeply into porous substrates such as paper, producing images with unacceptable showthrough. They cannot be fused at temperatures much above the melting point of the wax, and may require high transfuse pressures to help in fusing the solid wax to the paper. Such pressures, while they can be used with the inks of the present invention, are not needed to produce robust images.

In another embodiment, the recording substrate onto which droplets of the melted ink are ejected in an imagewise pattern, whether it is the final recording substrate (in a direct printing process) or an intermediate transfer member (in an indirect printing process), is maintained at a temperature at which the ink is in the gel state, i.e., at a temperature below the onset of gelation when cooling from the melt or liquid state. Without being limited to any specific theory, it is believed that in this embodiment, the substrate temperature (either the final substrate or the intermediate transfer member) is set at an optimum temperature for the formation of a reinforcing gel network. It is believed that the image thus formed will have improved robustness as a result of the reinforcement of the ink vehicle with the gel. Upon cooling or, in the case of an indirect printing method, transfer to the final substrate, the network is frozen within the ink vehicle.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

Fusing can be by any desired or effective method, such a those commonly known in the art of electrophotography. For example, the ink preferably is fused to the final recording substrate due to the final recording substrate being at a temperature lower than the temperature at which the ink liquefies and evaporation of the liquid vehicle.

The following examples were prepared to further illustrate embodiments of the invention.

Examples 1 and 2 demonstrate the synthesis of SFRP-PSS Polyelectrolytes.

EXAMPLE 1

Homopolymer

Sodium styrenesulfonate (600 g), TEMPO (2,2,6,6,-tetramethyl-1-piperidinyloxy, free radical) (6.86 g, 0.44 mol), $K_2S_2O_8$ (6.59 g, 0.244 mol) and $Na_2CO_3$ (3.8 g) were added to a solution of ethylene glycol (1120 mL) and deionized water (480 mL) in a round bottomed (5 L) equipped with a gas inlet and condenser. The formed solution was deoxygenated by bubbling nitrogen through the solution while heating to reflux. The solution was heated for 8 hours and then cooled and precipitated into 10 L of an acetone/methanol (80:20) solution. The resulting precipitate was left standing over the weekend, decanted and the solid filtered. The solid was washed once with a 1 L solution of acetone/methanol (1:1) then filtered and air dried. This was then dried in vacuo at 60° C. to yield 202 grams.

EXAMPLE 2

Copolymer

Solution polymerizations with styrenesulfonic acid, sodium salt (SSNa) were performed in the presence of TEMPO (2,2,6,6-tetramethyl-1-piperidinyloxy, free radical) in aqueous ethylene glycol (80%) at 125° C. While a number of different initiating systems can be used, the preferred one is potassium persulfate/sodium bisulfate. Typically, polymerizations are performed over 6 hours at monomer to initiator ratios of 20/1 and nitroxide to initiator ratios of 2. Upon completion of this reaction, the B block monomer, e.g., acrylamide, would be added to the solution for the second step. Samples are isolated by precipitation into a methanol/acetone solution followed by filtration. A block copolymer of polystyrenesulfonate and acrylimide was formed by the following reaction:

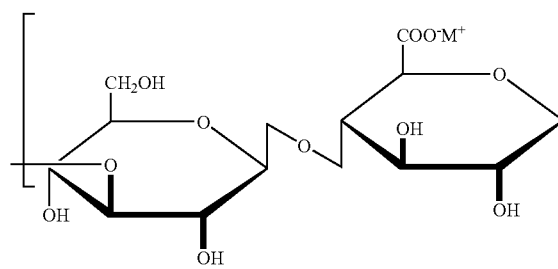

+

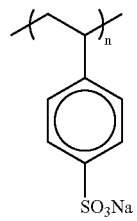

→

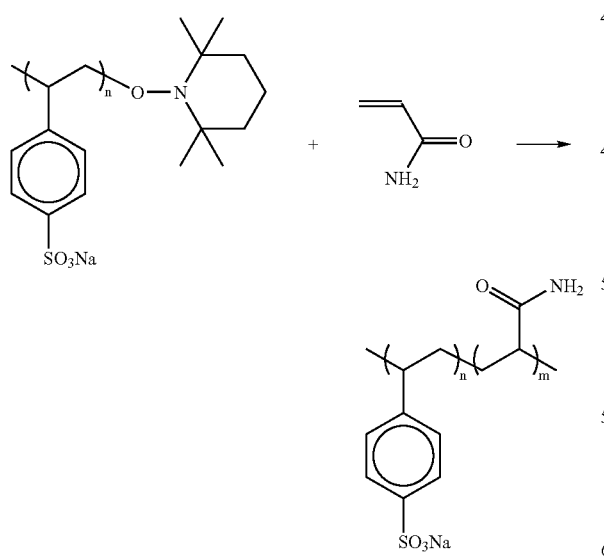

Eight inks (Examples 3 to 10) were formulated as set forth in Table 1 to demonstrate the advantages of the inks disclosed herein. All amounts in Table 1 are weight percentages on the basis of the ink. Each Example 3-10 is further described below Table 1.

TABLE 1

| | Example # | | | | | | | |
|---|---|---|---|---|---|---|---|---|
| | 3 | 4 | 5 | 6 | 7 | 8 | 9 | 10 |
| Kelcogel AFT | 0.5 | 0.5 | 0.5 | 0.5 | 0.5 | 0.5 | 0.75 | 1 |
| SP$^2$ | | 0.2 | | | | | | |
| SFRP-PSS | 0.2 | | | 2 | | 1 | 0.3 | 0.4 |
| Trizma HCL | | | 0.2 | | 2 | | | |
| Glycerol | 30 | 30 | 30 | 30 | 30 | 30 | 30 | 30 |
| Butyl Carbitol | 5 | 5 | 5 | 5 | 5 | 5 | 5 | 5 |
| Dye | 0.5 | 0.5 | 0.5 | 0.5 | 0.5 | 0.5 | 0.5 | 0.5 |
| Water | 63.8 | 63.8 | 63.8 | 62 | 62 | 63 | 63.45 | 63.1 |

The KELCOGEL AFT® used as the gelling agent has the following structure:

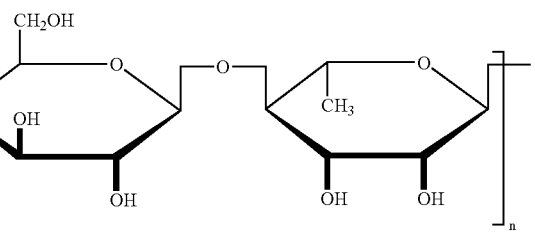

The structure of polystyrenesulfonate is as follows:

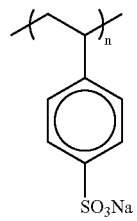

EXAMPLE 3

A gel ink was made as follows using the proportions given in Table 1. Cold water (50% of the total amount) was mixed with an overhead mixer while the Kelcogel AFT® was added. Once addition was complete, the sample was heated to 60° C. for until dissolved, approximately 30 minutes. Separately, the SFRP-PSS of Example 1 was pre-dissolved in the remaining amount of water at room temperature. The SFRP-PSS solution was then added to the water/Kelcogel AFT® mixture, followed by the addition of the glycerol, butyl carbitol and colorant. The resulting ink sample was mixed while keeping the temperature of about 60° C. for another half an hour hour. The heat was turned off and the sample was mixed until cool.

EXAMPLE 4

A gel ink was made as in Example 3 except that a commercial PSS (SP$^2$) having a weight average molecular weight of 70,000 and a polydispersity of 3.8, was used instead of the SFRP-PSS.

EXAMPLE 5

A gel ink was made as in Example 3 except that TRIZMA-HCL® was used instead of the SFRP-PSS.

EXAMPLE 6

A gel ink was made as in Example 3 except that the amount of SFRP-PSS was increased to 2 weight %. All other components remained the same except water, as shown in Table 1.

EXAMPLE 7

A gel ink was made as in Example 5 except that the amount of TRIZMA-HCL® was increased to 2 weight %. All other components remained the same except water, as shown in Table 1.

EXAMPLE 8

A gel ink was made as in Example 3 except that the amount of SFRP-PSS was increased to 1 weight %. All other components remained the same except water, as shown in Table 1.

EXAMPLE 9 AND 10

The inks of Examples 9 and 10 were formulated as in Example 3 except that the amount of SFRP-PSS and KELCO-GEL AFT® were increased proportionally as shown Table 1. The ratio of KELCOGEL AFT® to SFRP-PSS was kept constant at 2.5.

All ink samples were filtered through 0.45 μm filters and comparative rheology data was obtained. Table 2 shows the comparative data for samples 3, 4 and 5.

Results

TABLE 2

Viscosity Data for Examples 3, 4 and 5 of Table 1

| Sample at 10 s$^{-1}$ | 25° C. (cPs) | 40° C. (cPs) | 60° C. (cPs) | 80° C. (cPs) |
|---|---|---|---|---|
| Ink 3 (SFRP-PSS) | 378.1 | 13.44 | 9.37 | 9.39 |
| Ink 4 (SP$^2$) | 545.6 | 24.79 | 18 | 17.67 |
| Ink 5 (TRIZMA-HCl ®) | 462.2 | 17.22 | 19.73 | 9.39 |

The viscosity was measured at a shear rate which is recorded in reciprocal seconds. One of ordinary skill in the art is familiar with this measurement.

The PSS made using the SFRP process yielded an ink having an acceptable jetting viscosity at temperature as low as 40° C. while both the commercial PSS and the buffer containing ink (no polymeric electrolyte) had much broader gel transitions and acceptable jetting viscosity was achieved only at 80° C. or higher. In practice, jetting temperatures higher than 70° C. are not preferred for water based inks due to the impact of water evaporation on jetting reliability and the need for more frequent maintenance cycles.

As the concentration of PSS increased, the sol-gel transition temperature also increased. For example, increasing the concentration of SFRP in the ink from 0.2 to 2 weight % produced an 8° C. increase in the sol-gel temperature. In other words, the onset for the viscosity increase seen when cooling the ink increased from about 29° C. to about 37° C. This increase in the temperature for the sol-gel transition provides some latitude for the temperature of the substrate that can be used with the phase change ink, thereby accommodating broader printing conditions and environments. The sol-gel transition remained sharp with the increase in the SFRP-PSS concentration, ensuring that a rapid viscosity-increase transition will still occur on the substrate.

In contrast, while the ink having 0.2 weight % of TRIZMA-HCL® experienced a sharp sol-gel transition, a similar ink having 2 weight % of TRIZMA-HCL® did not show the same sharp transition. The initial viscosity of the 0.2% TRIZMA-HCL® concentration sample was lower than that with the SP$^2$, ~460 cPs vs. 550 cPs. At 2 weight % concentration, the transition gradually begins to occur but does not undergo the full transition to liquid. The viscosity does not decrease to a range suitable for jetting.

When the ink is a gel at ambient temperature, the gel is heated above the sol-gel temperature and jetted at an elevated temperature. At the elevated temperature, the liquid has physical properties desirable for jetting, such as a moderately low viscosity. When the liquid contacts the drum or other substrate, which is maintained below the sol-gel temperature, it undergoes a phase transition to a gel state.

By selecting an appropriate combination of gellant and electrolyte types and concentrations, the physical properties desirable for transfuse onto paper from an intermediate drum or belt surface is possible. In addition, the gels enable improved control of the ink penetration and spreading into paper or other porous substrate. Contrary to wax based phase change inks, the inks described herein do not protrude from the surface of most substrates where they would be prone to smearing or flaking.

The gel should be thermally reversible, i.e., it should be capable of repeatedly moving back and forth through the sol-gel transition temperature and becoming a gel and liquid as necessary. Although once evaporation of the liquid in the gel has occurred, the gel will not reverse into a liquid again.

This concept is similar to solid or hot-melt phase change inks in that having undergone the phase transition, the elevated viscosity allows for the ink drops to freeze on the drum, allowing for a sharply defined print to be produced.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An ink comprising a liquid vehicle, a gelling agent, an electrolyte and optionally at least one colorant;
   wherein the electrolyte is a sulfonated polyester selected from the group consisting of poly(1,2-propylene-sodio 5-sulfoisophthalate), poly(neopentylene-sodio 5-sulfoisoplithalate), poly(diethylene-sodio 5-sulfoisophthalate), copoly(1,2-propylene-sodio 5-sulfoisophthalate)-copoly -(1,2-propylene-terephthalate-phthalate), copoly(1,2-propylene-diethylene-sodio 5-sulfoisophthalate) -copoly-(1,2-propylene-diethylene-terephthalate-phthalate), copoly(ethylene-neopentylene-sodio 5-sulfoisophthalate)-copoly-(ethylene-neopentylene-terephthalate-phthalate) and copoly(propoxylated bisphenol A)-copoly-(propoxylated bisphenol A-sodio 5-sulfoisophthalate), and
   wherein the electrolyte is a polymeric electrolyte generated by a stable free readical polymerization process, and
   wherein the polymeric electrolyte is bonded to a film forming polymer generated by the stable free radical polymerization process in forming a block copolymer.

2. The ink according to claim 1, wherein the liquid vehicle is water.

3. The ink according to claim 2, wherein the liquid vehicle further comprises a co-solvent.

4. The ink according to claim 3, wherein the co-solvent is ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones, alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine or mixtures thereof.

5. The ink according to claim 1, wherein the gelling agent is agar, algin, carrageenan, fucoidan, laminaran, gum Arabic, corn hull gum, gum ghatti, guar gum, karaya gum, locust bean gum, pectin dextrans, starches, carboxymethylcellulose, polyvinyl alcohol, gellan gum, xanthum gum, iota-carrageenan, methylcellulose or mixtures thereof.

6. The ink according to claim 1, wherein the gelling agent is from about 0.00 1 to about 5.0 weight percent of the ink.

7. The ink according to claim 1, wherein a ratio of the gelling agent to the electrolyte is about 1.5:1 to about 4:1.

8. The ink according to claim 1, wherein the electrolyte is polystyrenesulfonate.

9. An ink comprising a liquid vehicle, a gelling agent, an electrolyte and optionally at least one colorant;
    wherein the electrolyte is a polymeric electrolyte generated by a stable free radical polymerization process;
    wherein the polymeric electrolyte is bonded to a film forming polymer generated by the stable free radical polymerization process in forming a block copolymer
    wherein the polymeric electrolyte is polystyrenesulfonate or copolymers thereof; and
    wherein the film forming polymer is synthesized from monomers or blends of monomers selected from the group consisting of vinyl esters, acrylic esters, methacrylic esters, methyl (meth)acrylate, ethyl(meth) acrylate, isopropyl (meth)acrylate, n-butyl (meth)acrylate, isobutyl (meth)acrylate, n-amyl(meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-hydroxylethyl (meth)acrylate, 2-hydroxypropyl (meth)acrylate, glycidyl (meth)acrylate, glycidyl acrylate, vinyl acetate, acrylonitrile, methacrylonitrile, aromatic vinyl compounds, styrene, 2-methyistyrene, vinyltoluene, t-butylstyrene, chiorostyrene, vinylidene fluoride, ethylene, propylene, isopropylene, butadiene, vinyl pyrrolidone, vinyl chloride, vinyl either, vinyl detone, chloroprene, carboxyl-containing compounds, ethylenically unsaturated carboxylic acids, acrylic acid, methacrylic acid, maleic acid, itaconic acid, fumaric acid, amido-containing compounds, acrylamide, N,N-dimethylacrylamide, N-methylaminoethyl methacrylate, N-methylaminoethyl acrylate, diemethylaminoethyl methacrylate, diethylaminoethyl methacrylae, diethylaminoethyl methacrylate, unsaturated amides containing an alkylamino group, N-(2-dimethylaminoethyl)acrylamide, N-(2-dimethylaminoethyl) methacrylamide N,N-dimethylaminopropylacrylamide, monovinylpyridines, vinylpyridine, vinyl ethers containing an alkylamino group, dimethylaminoethyl vinyl ether, vinylimidazole, vinylsulfonic acid, styrenesulfonic acid and 2-acryloylamino-2-methylpropanesulfonic acid.

10. The ink according to claim 1, wherein the electrolyte is about 0.1 weight % to about 5.0 weight % of the ink.

11. The ink according to claim 1, wherein the ink liquefies at a temperature of about 30° C. to about 80° C.

12. The ink according to claim 1, wherein the ink is in a gel state at a temperature of about 15° C. to about 50° C.

13. The ink according to claim 1, wherein the ink is jetted onto an image recording medium, wherein the ink is jetted at a temperature of about 30° C. to about 80° C. and the image recording medium has a temperature of about 15 0° C. to about 50° C.

14. A method of forming an image, comprising:
    heating according to claim 1 to a first temperature, wherein the first temperature is above a sol-gel temperature,
    jetting the heated ink onto a transfer member, wherein the transfer member is maintained at a second temperature at which the ink forms a gel, and
    transferring the ink from the transfer member to an image receiving substrate.

15. The method according to claim 14, wherein the first temperature is from about 30° C. to about 80° C. and the second temperature is from about 15° C. to about 50° C.

16. A method of forming an image, comprising:
    heating ink according to claim 1 to a first temperature, wherein the first temperature is above a sol-gel temperature, and
    jetting the heated ink onto an image receiving substrate, wherein the image receiving substrate is maintained at a second temperature at which the ink forms a gel.

17. The method according to claim 16, wherein the first temperature is from about 30° C. to about 80° C. and the second temperature is from about 15° C. to about 50° C.

18. The ink according to claim 1, wherein the gelling agent is an acyl gellan gum.

* * * * *